United States Patent

Maguire

[15] 3,636,551
[45] Jan. 18, 1972

[54] COMPUTER-CONTROLLED THREE-DIMENSIONAL DISPLAY

[72] Inventor: Edward T. Maguire, Newtown Square, Pa.
[73] Assignee: Ke General Corporation, Paoli, Pa.
[22] Filed: May 15, 1969
[21] Appl. No.: 824,872

[52] U.S. Cl...................340/324 R, 178/6.5, 315/169 R, 340/23, 340/26, 340/225, 340/334
[51] Int. Cl..........................................................G06f 3/14
[58] Field of Search.................340/324, 26, 23, 225, 334, 340/324 R; 178/6.5; 315/169, 169 TV

[56] References Cited

UNITED STATES PATENTS

| | | | |
|---|---|---|---|
| 2,749,480 | 6/1956 | Ruderfer | 178/6.5 X |
| 2,762,031 | 9/1956 | Fryklund | 315/169 X |
| 3,026,501 | 3/1962 | Gray | 340/225 X |
| 3,177,486 | 4/1965 | Crooker | 178/6.5 X |

*Primary Examiner*—David L. Trafton
*Attorney*—Paul & Paul

[57] ABSTRACT

An apparatus is disclosed comprising a three-dimensional display unit having located therein, at regular coordinate intervals, display elements which indicate the coordinate positions of objects in a three-dimensional space, and control logic circuitry by which said display elements are controlled and driven. The apparatus interfaces with a general purpose digital computer from which it derives data inputs which are processed so as to present a real-time display of moving objects, as well as directions of movement.

3 Claims, 6 Drawing Figures

PATENTED JAN 18 1972
3,636,551
SHEET 1 OF 3
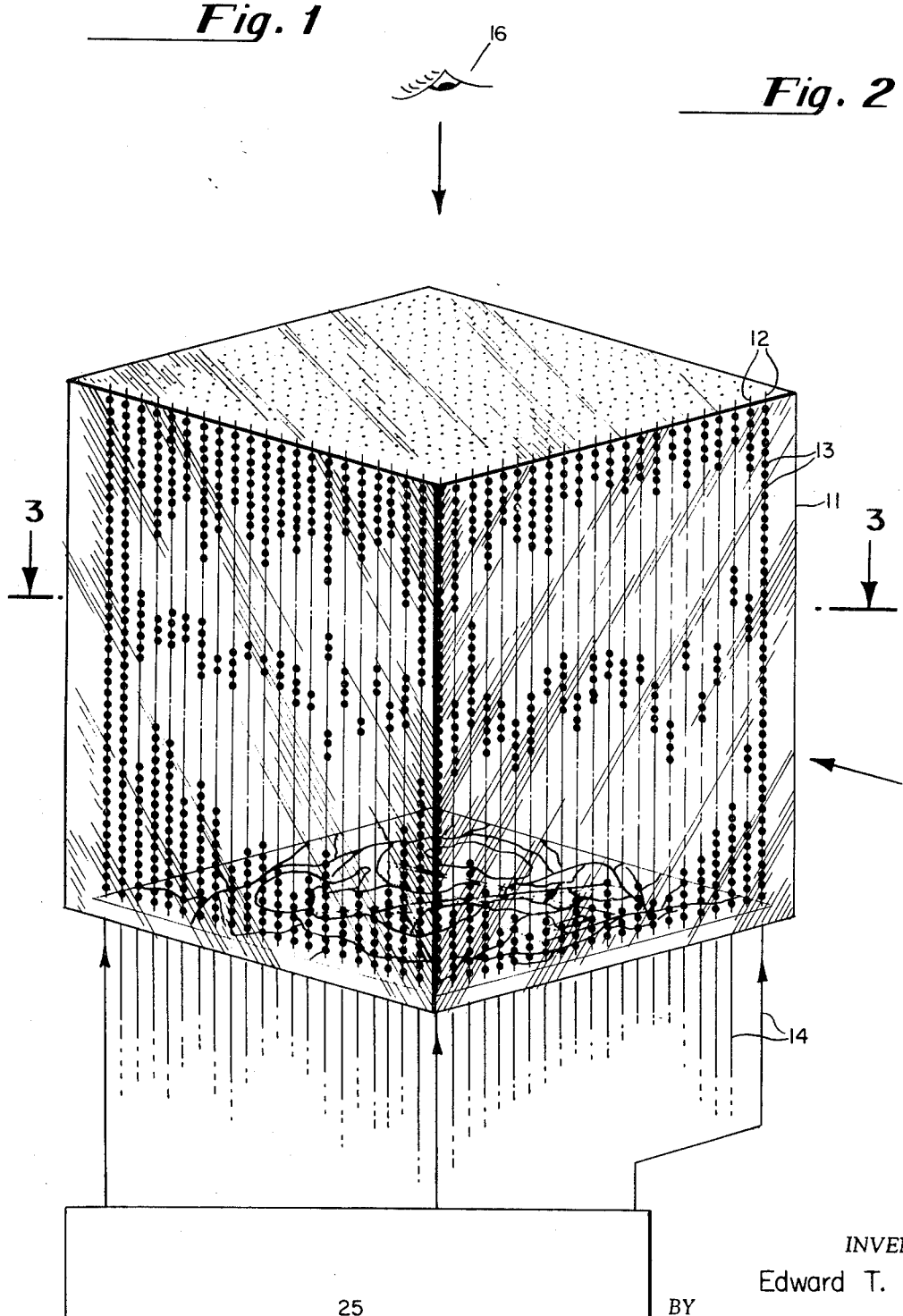
Fig. 1
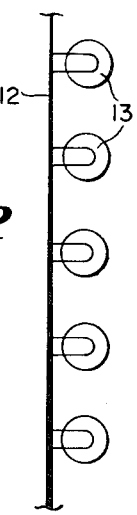
Fig. 2
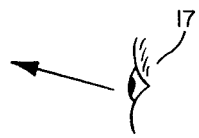
INVENTOR.
Edward T. Maguire
BY
Paul & Paul
ATTORNEYS.

INVENTOR.
Edward T. Maguire
BY
Paul & Paul
ATTORNEYS.

COMPUTER-CONTROLLED THREE-DIMENSIONAL DISPLAY

BACKGROUND OF THE INVENTION

1. Field of the Invention

This invention lies in the field of three-dimensional position indicators and, more particularly, computer-controlled three-dimensional position indicators.

2. Description of the Prior Art

The problem of providing accurate, real time indication of aircraft location is one of most serious concern to the Federal Aviation Agency, airport traffic controllers, and all parties concerned with aircraft control. The increasingly crowded conditions that exist at virtually all major airports, as well as at regional airports, has created problems of crisis proportions. The lack of adequately presented information relating to aircraft in the vicinity has caused great strain to be placed on air terminal controllers and other personnel bearing responsibility of directing traffic in and about airport facilities. In an attempt to alleviate this problem, much extensive equipment has been developed and installed in airplane terminals. Radar systems, presenting two-dimensional displays, are standard equipment. However, the cathode-ray oscilloscope output devices utilized with radar systems present a limited visual image and, more importantly, cannot present the three-dimensional picture which is so important in such control work. Further, oscilloscope displays cannot give the viewer a prediction of the directions of the planes involved and expected courses of movement. Consequently, the air terminal controller is forced to view a plurality of display devices, each presenting a fraction of the overall picture, and to attempt to obtain from same the overall picture in the vicinity. This imposes a virtually impossible task upon the controller. There remains a great need for a large scale, three-dimensional display which will enable a viewer to easily observe the positions of aircraft in the vicinity and their relative bearing with respect to each other.

SUMMARY OF THE INVENTION

The primary object of this invention is to provide, in a three-dimensional display, the present position of a plurality of objects in a three-dimensional space, a history of the previous positions of such objects, and a computed forecast of the future positions.

It is a further object of this invention to provide a means of depicting the relative position of a plurality of objects with respect to both manmade and natural terrain features and other references.

It is a further object of this invention to provide a three-dimensional computer controlled display capable of being adaptable to a plurality of distance scales.

It is a further object of this invention to provide a real time, three-dimensional display capable of interfacing with a general purpose digital computer, thereby to accurately and instantaneously present the movements of a plurality of objects in a three-dimensional space.

A further object of this invention is to provide the observer or controller with a more relaxed means of monitoring the position of a plurality of objects in an environment of high traffic density.

It is a further object of this invention to provide the observer or controller with a more relaxed means of monitoring the position of a plurality of objects in an environment of high traffic density.

It is a further object of this invention to provide a means for closer supervision of a large traffic area or a plurality of traffic sectors.

It is a further object of this invention to provide a display system which will reduce the stress and fatigue of air terminal controllers.

It is a still further object of this invention to provide a means for the observation of trajectories of ballistic objects in three-dimensional space.

It is a still further object of this invention to provide the means for generating graphic, animated three-dimensional displays.

It is a further object of this invention to provide a graphic tool for the display of scientific or engineering phenomena.

Accordingly, this invention provides a three-dimensional display structure made of a transparent material such as lucite, or any other commercially available material which is rigid and transparent. A plurality of display elements are arranged at regular, periodic intervals throughout the interior of the three-dimensional structure. The display elements are carried on thin support elements which are barely visible, and which are rendered less visible by the use of artificial lighting techniques. The elements within the three-dimensional structure which correspond to objects in three-dimensional space are made visible to the observer in a manner such as to indicate both the location of said objects and the directions in which they are proceeding. A general purpose computer provides information in data form with regard to the objects in three-dimensional space, the computer data being processed by control circuitry which selects and drives the appropriate display elements.

BRIEF DESCRIPTION OF THE DRAWINGS

FIG. 1 is a perspective view of the three-dimensional display structure, and the matrix of display elements as located therein.

FIG. 2 depicts light bulbs, the display element is the preferred embodiment, as attached to a supporting element.

DESCRIPTION OF THE PREFERRED EMBODIMENT

Figure 3:
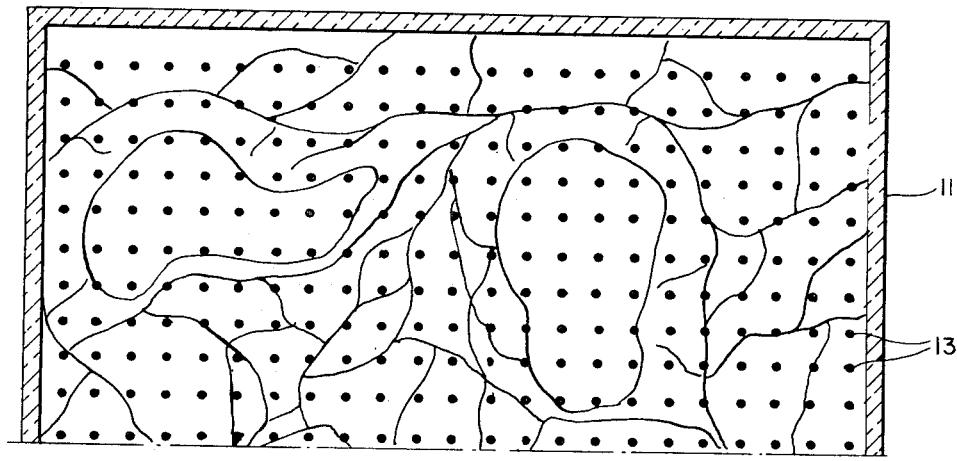
FIG. 3 is a representation of the view obtained by an observer looking down upon the three-dimensional display structure, with a two-dimensional contour diagram as background upon which the display elements are seen.

Referring now to the drawings, FIG. 1 shows a perspective view of the three-dimensional display structure. In the preferred embodiment, the structure 11, which defines the space being monitored and provides support for the display elements 13, is composed of clear lucite, although any equivalent commercially available transparent material could be utilized. Structure 11 has a hollow interior within which the display elements are placed at regular coordinate intervals. Although the three-dimensional structure 11 is shown in this drawing as being cubical in form, it could be of any size and of any three-dimensional shape, e.g., cylindrical, as would provide optimum viewing relative to the setting where the apparatus is housed.

The display elements 13 are supported by support elements 12. In the preferred embodiment of this invention, a 70×70× 50 matrix of display elements is utilized, there thus being 4,900 support elements, each carrying 50 display elements. However, it is apparent that any size matrix can be utilized within the scope of this invention.

The display elements 13 will, in the preferred embodiment, be lamps as shown in FIG. 2. Support element 12 embodies a plurality of wires which couple to the respective lamps 13. The wires are extremely thin, and are coated with or wrapped in teflon or a similar material which will visually obliterate the supporting structure. The use of artificial lighting at frequencies which are not reflected by such materials further aids in reducing the visibility of the supporting elements 12.

In order to provide perspective for the viewers of this apparatus, environmental features, in scale with respect to the physical space being represented, may be presented on one face of the three-dimensional structure. As shown in FIG. 1, contour lines are representing, for example, the ground surface near an airport, are shown superimposed on the bottom face of the display structure. Thus, a viewer observing the display structure from position 16 would see the display elements superimposed on a background, as is represented in FIG. 3, showing part of a cross-sectional view taken at lines 3—3 shown in FIG. 1.

Figure 4:
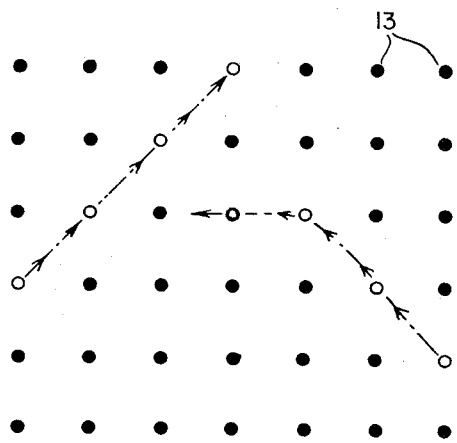
FIG. 4 shows one section of the three-dimensional display structure as observed from above, with two moving objects being designated by display elements.
Figure 5:
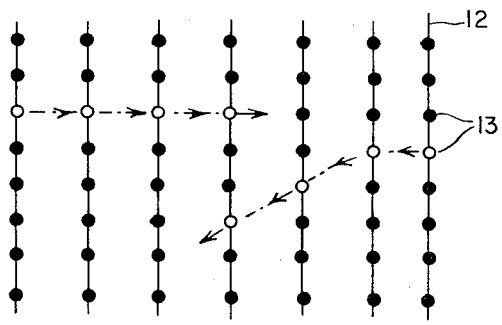
FIG. 5 represents a side elevation view, showing the path of the same two objects as charted in FIG. 4, as seen here from the side.

In order to further show the three-dimensional nature of the subject apparatus, two views are presented of the same target display, said target being represented by four contiguous display elements. Thus, in FIG. 4, the paths of two objects are represented as seen when looking directly downward from position 16. Correspondingly, FIG. 5 shows the same display elements as viewed from a side elevation, position 17, from which position the observer can obtain elevation information.

Figure 6:
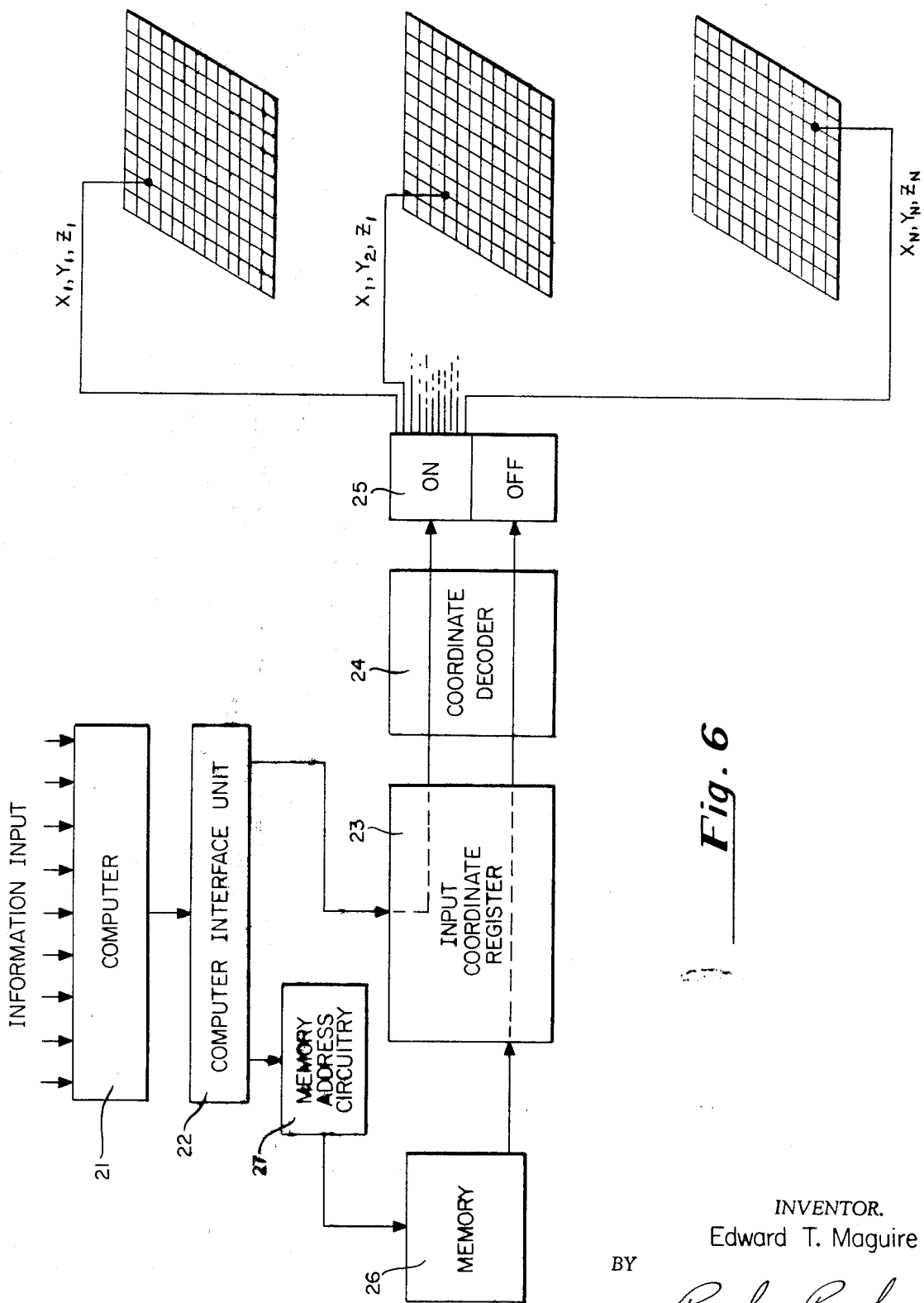
FIG. 6 is a block diagram representation of the system control logic.

The means by which specific display elements are addressed and energized in accordance with instructions from a computer or other sequencing device is shown in FIG. 6. In the preferred embodiment, information respecting a plurality of aircraft or other objects is obtained by radar or other conventional means and processed by a general purpose digital computer 21. The apparatus of this invention is designed to accept information from the computer for the monitoring of a plurality of objects. Insomuch as past and present information concerning an object is presented, the display relative to any one such object is referred to as a track.

An object, or track, which is being displayed by the apparatus of this invention, can be represented by a plurality of display elements. As shown in FIGS. 4 and 5, four such display elements, or lamps, could represent a given object or aircraft. In such case, the four display elements would represent sequential locations of the object being tracked. Each time the computer provides information with respect to a given track, it provides only the lead coordinate, i.e., that X Y Z coordinate corresponding to the latest information with respect to the object being tracked. If a new lead coordinate for a given track is provided by the computer or other input device, a new display element is energized and the control logic causes the trailing element to be turned off.

The computer sequentially provides information with respect to each of the plurality of tracks, making a complete cycle in several milliseconds. This information is processed such as to energize driving circuits which turn on those display elements which correspond to said plurality of tracks.

Referring again to FIG. 6, input coordinate data corresponding to any given track is provided by the computer in the form of coordinate data bits, and coupled into a computer interface unit 22 comprised of conventional logic gates. The coordinate data bits are coupled to an input coordinate register 23, which register assumes a binary code corresponding to the X Y Z coordinate information supplied by the computer. This coordinate information is decoded by coordinate decoder 24, which gates through the coordinate information to the particular display element. For the 70×70×50 matrix, for example, the coordinate decoder 24 has 70 outputs corresponding to the 70 display elements in the X-dimension, 70 outputs corresponding to the 70 elements in the Y-dimension, and 50 outputs corresponding to the 50 elements in the Z-dimension, or a total of 245,000 different display element outputs. Only that output corresponding to the X Y Z information in the input coordinate register 23 is gated to permit the corresponding display element to be energized.

Still referring to FIG. 6, each of the display element outputs is coupled to and drives an element driving means. In the preferred embodiment, this is a flip-flop 25 which, once set to an "ON" condition, will remain in such condition and drive the lamp to which it is coupled, until it is reset to the "OFF" condition by a signal from memory.

In order to show the direction of a given track, the lead display element is caused to alternate in an on and off condition. The coordinate information represented by the coordinate data bits, for the lead element of each of the plurality of tracks, is stored in a memory unit 26. The coordinate data for the lead element of each track is placed in memory, through memory address circuitry 27, each time track information is supplied by the computer. Periodically, e.g., every 0.25 second, the lead, or heading element information for each track is read out of memory along with an on-off signal, which is a command to turn the corresponding display element off. The on-off signal is coupled to and causes the flip-flop driver associated with its respective display element to be reset to zero, thus turning the element off. The element will be turned on again next time the computer provides track data. Consequently, each heading element is caused to flash on and off, thus indicating the direction of the track.

Although this invention has been illustrated using a four element track, any number of elements could be utilized in a particular application. The computer control means as shown in block diagram form in FIG. 6 is comprised of conventional data logic and processing circuitry, and this invention comprises no claim dealing with the specifics of this circuitry. However, the technique of decoding the data input from the computer, or other input device, whereby to select the appropriate display element, and the technique of storing heading element information in memory, and using such stored information to provide a visible indication of the direction of a track, are essential elements of the apparatus of this invention. Although in the preferred embodiment the display elements are lamps, any other type of element, electrically controllable, can be utilized, with appropriate element driving means. Thus, a mechanically operated display element could be driven by a solenoid or other relay activated means.

Similarly, the number of tracks which can be presented simultaneously is limited only by the computer capacity, and the capacity of memory 26. The coordinates information could be provided and processed in either cartesian or polar form.

Further, the three-dimensional structure 11 can be scaled to represent any desired range of distances within which objects are to be tracked. The scale distance between contiguous display elements will define the resolution of the apparatus. For example, if the information provided to the system did not resolve objects less than one-half mile of each other, the distance between contiguous lights would be scaled to represent a maximum of one-half mile. Thus, the size of the display element matrix, and the scale adopted, will be functions of the desired resolution and the overall air space being monitored. Where the invention is used for generating graphic displays, scaling is a factor only inasmuch as it is desirable to utilize the full breadth of the display space.

What is claimed is:

1. A computer-controlled three-dimensional display system for simultaneous display of a plurality of object tracks, comprising the following apparatus:

a. three-dimensional structural display means comprising an exterior of a rigid and transparent material, said exterior defining a hollow three-dimensional interior space;

b. a plurality of display elements arranged throughout said three-dimensional space at regular coordinate intervals;

c. display element energizing means for energizing said display elements;

d. a plurality of support elements for supporting said regularly spaced display elements, each of said support elements supporting a respective line of display elements and being parallel one to another and extending from a first surface of said exterior to an opposite surface thereof, each such support element embodying a plurality of wires coupling the line of display elements which it supports to said energizing means;

e. computer means for providing information in digital form, said information representing said plurality of object tracks;

f. decoder means, for decoding said digital information, connected to said energizing means; and, g. computer interface means for coupling said digital data provided by said computer means to said decoder means.

2. The invention as described in claim 1 wherein said three-dimensional structural display means contains upon a surface thereof a two-dimensional surface display to present a background against which said display elements can be viewed.

3. The invention as described in claim 10 wherein each track is displayed by energizing a plurality of contiguous display elements, and comprising memory means for storing digital information provided by said computer means and corresponding to the lead display element of each track display, said memory means being connected to said energizing means for transmitting signals thereto which cause said lead display element of each of said tracks to flash periodically thereby indicating the directions of said tracks.

\* \* \* \* \*